(12) United States Patent
Kang (10) Patent No.: US 11,982,419 B2
(45) Date of Patent: May 14, 2024

(54) LAMP FOR VEHICLE

(71) Applicant: HYUNDAI MOBIS CO., LTD., Seoul (KR)

(72) Inventor: Dong Hwa Kang, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 17/662,190

(22) Filed: May 5, 2022

(65) Prior Publication Data

US 2023/0003358 A1 Jan. 5, 2023

(30) Foreign Application Priority Data

Jun. 30, 2021 (KR) .................. 10-2021-0086026

(51) Int. Cl.
*F21S 43/20* (2018.01)
*F21S 41/40* (2018.01)

(52) U.S. Cl.
CPC ............... *F21S 43/26* (2018.01); *F21S 41/40* (2018.01); *F21S 43/20* (2018.01); *B60Q 2400/50* (2013.01)

(58) Field of Classification Search
CPC ...... B60Q 2400/50; F21S 41/26; F21S 41/20; F21S 41/40
See application file for complete search history.

(56) References Cited

U.S. PATENT DOCUMENTS

| | | | | |
|---|---|---|---|---|
| 10,125,942 B2* | 11/2018 | Park | ........................ | F21S 43/14 |
| 10,220,770 B2* | 3/2019 | Son | ........................ | B60Q 1/525 |
| 10,676,017 B2* | 6/2020 | Murakami | ............... | B60Q 1/14 |
| 10,928,029 B1* | 2/2021 | Woo | ........................ | F21S 43/26 |
| 11,012,669 B2* | 5/2021 | Miao | .................... | G03B 21/145 |
| 11,156,334 B2* | 10/2021 | Morel | ...................... | B60Q 1/14 |
| 11,235,700 B2* | 2/2022 | Brill | ........................ | F21S 41/141 |
| 11,555,593 B2* | 1/2023 | Schadenhofer | ......... | F21S 43/26 |
| 2013/0010484 A1* | 1/2013 | Son | ........................ | B60Q 1/346 |
| | | | | 362/464 |
| 2019/0322209 A1* | 10/2019 | Sugiyama | ............... | F21S 43/26 |
| 2020/0063938 A1* | 2/2020 | Kurashige | .............. | G02B 27/30 |
| 2022/0120406 A1* | 4/2022 | Woo | ........................ | F21S 43/20 |

FOREIGN PATENT DOCUMENTS

WO WO-2022215706 A1 * 10/2022

OTHER PUBLICATIONS

Diode Dynamics, "LED Brightness", Jul. 14, 2019 as established by Wayback machine (Year: 2019).*

* cited by examiner

*Primary Examiner* — Matthew J. Peerce
(74) *Attorney, Agent, or Firm* — DLA Piper LLP (US)

(57) ABSTRACT

A lamp for a vehicle includes an optical unit including a plurality of optical modules to form a specific beam pattern on a road surface, the beam pattern includes a first pattern area and a second pattern area more spaced apart from the optical unit than the first pattern area, the optical unit includes a first optical module to form the first pattern area and a second optical module to form the second pattern area, and the second pattern area is placed on an optical axis of the second optical module.

10 Claims, 12 Drawing Sheets

LAMP FOR VEHICLE

CROSS-REFERENCE TO RELATED APPLICATION

This application claims the benefit of priority to Korean Patent Application No. 10-2021-0086026, filed in the Korean Intellectual Property Office on Jun. 30, 2021, the entire contents of which are incorporated herein by reference.

TECHNICAL FIELD

The present disclosure relates to a lamp for a vehicle, and more particularly to a lamp for a vehicle, capable of improving the uniformity in luminous intensity.

BACKGROUND

In general, a guide lamp provided in a vehicle includes a reverse guide lamp and a turn signal guide lamp. The reverse guide lamp of the reverse guide lamp and the turn signal lamp is turned on with a reverse lamp, the light emitted from the reverse guide lamp is projected onto the road surface positioned in back of a host vehicle to deliver the intention of a driver to back up the vehicle, to a surrounding vehicle and a pedestrian, and a forward direction of the vehicle is notified to another vehicle, thereby preventing an accident in advance. The turn signal lamp is a lamp to notify another vehicle of a lane change or a forward direction of the vehicle at the crossroad.

Figure 1:
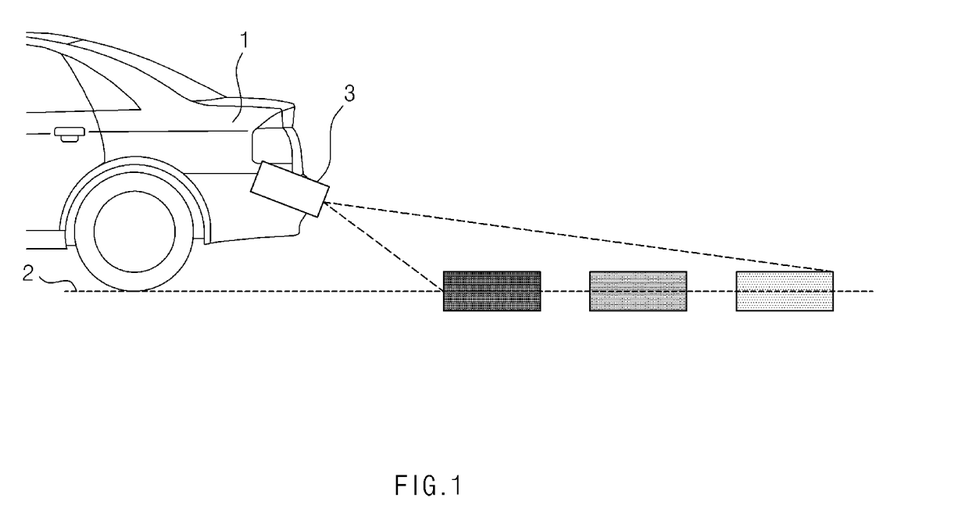
FIG. 1 is a view illustrating that a conventional guide lamp for a vehicle is mounted.
Figure 2:
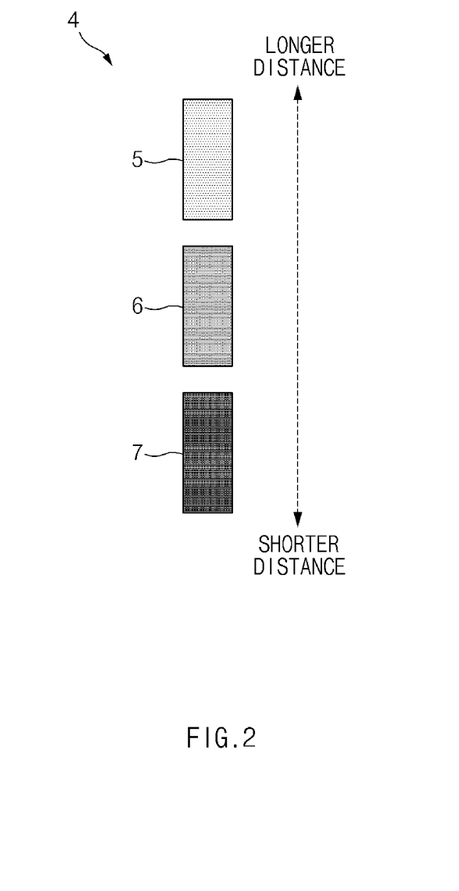
FIG. 2 is a view illustrating a beam pattern of light irradiated on a road surface by a conventional guide lamp for a vehicle.

FIG. 1 is a view illustrating that a conventional vehicle guide lamp 3 is mounted in a vehicle, and FIG. 2 is a view illustrating a beam pattern 4 of light irradiated on a road surface 2 by the conventional vehicle guide lamp 3. The guide lamp of the vehicle may project light onto the road surface adjacent to the vehicle, such that a pattern image having a specific shape is realized on the road surface.

However, the conventional guide lamp may be formed to realize only a simple image pattern, and may not exactly realize a correct shape. In addition, when multiple patterns are realized, the patterns may not be shield from each other. Accordingly, light sources are required in number corresponding to the number of the patterns to be realized. Accordingly, costs are increased, and a weight is increased.

Further, in the imaging optical system employing the guide lamp, an amount of light is decreased farther away from the central portion of the optical axis. Accordingly, it is difficult to ensure an amount of light in the longer-distance pattern. For example, referring to FIG. 2, when the beam pattern 4 includes a plurality of patterns 5, 6, and 7, an amount of light is more degraded at a longer distance, such that an image of the longer-distance pattern 5 is not cleared. Accordingly, there is required a guide lamp technology of realizing various patterns and improving the uniformity in luminous intensity of a pattern.

SUMMARY

The present disclosure has been made to solve the above-mentioned problems occurring in the prior art while advantages achieved by the prior art are maintained intact.

An aspect of the present disclosure provides a lamp for a vehicle, capable of improving the uniformity in illuminance of a beam pattern, as a plurality of optical modules are included in an optical unit, and of improving light efficiency by minimizing the loss of an amount of light.

Another aspect of the present disclosure provides a lamp for a vehicle, capable of improving the uniformity of a beam pattern of light irradiated on a road surface, as an optical axis of any one of a plurality of optical modules is positioned in a pattern area positioned at the longest distance.

Another aspect of the present disclosure provides a lamp for a vehicle, capable of more improving the uniformity in illuminance between pattern areas included in a beam pattern, as a plurality of light modules are adjusted to differ from each other in the intensity of light.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a lamp for a vehicle includes an optical unit including a plurality of optical modules to form a specific beam pattern on a road surface. The beam pattern includes a first pattern area and a second pattern area more spaced apart from the optical unit, than the first pattern area. The optical unit includes a first optical module to form the first pattern area, and a second optical module to form the second pattern area. The second pattern area is placed on an optical axis of the second optical module.

An optical axis of the second optical module may pass through the central portion of the second pattern area.

The first optical module and the second optical module may be provided such that intensity of light emitted from the first optical module differs from intensity of light emitted from the second optical module.

The first pattern area may be disposed on the optical axis of the first optical module.

An optical axis of the first optical module may pass through the central portion of the first pattern area.

The first optical module may include a first optical unit, a first lens unit to project light, which is irradiated by the first light source unit, on a road surface, and a first shield unit interposed between the first light source unit and the first lens unit, to shield a portion of light irradiated by the first light source unit to form the first pattern area.

The first shield unit may be provided to be replaceable such that the beam pattern is realized in various shapes.

The second optical module may include a second optical unit, a second lens unit to project light, which is emitted from the second light source unit, on a road surface, and a second shield unit interposed between the second light source unit and the second lens unit, to shield a portion of light irradiated by the second light source unit to form the second pattern area.

The second shield unit may be provided to be replaceable such that the beam pattern is realized in various shapes.

A current applied to a light source provided in a second light source unit may be greater than a current applied to a light source provided in the first light source unit.

The beam pattern may include a third pattern area interposed between the first pattern area and the second pattern area, and the first shield unit may include a first through area having a shape corresponding to a shape of the first pattern area. The second shield unit may include a second through area having a shape corresponding to a shape of the second pattern area, and a third through area having a shape corresponding to a shape of the third pattern area.

A lamp for a vehicle may include an optical unit including a third optical module to from a specific beam pattern on a road surface, and when a position, which is positioned at the longest distance from the optical unit, of the fourth pattern area is defined as a long-distance point, a position, which is positioned at the shortest distance from the optical unit, is defined as a short-distance point, and an intermediate position between the long-distance point and the short-distance point is defined as an intermediate point, the optical axis of the third optical module may be provided to pass through an area between the intermediate point and the long-distance point.

A lamp for a vehicle may include an optical unit including a fourth optical module to from a specific beam pattern on a road surface, the beam pattern may include a fifth pattern area and a sixth pattern area having at least a portion positioned at the longer distance from the optical unit than the fifth pattern area, and the sixth pattern area may be disposed on the optical axis of the fourth optical module.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, an embodiment of the present disclosure will be described in detail with reference to the accompanying drawings.

The following embodiments are embodiments appropriate to allow those skilled in the art to understand the technical features of a lamp for a vehicle according to the present disclosure. However, the present disclosure is not limited to embodiments to be described below, and the technical feature of the present disclosure is not limited by the embodiments. Accordingly, various modifications are possible within the technical scope of the present disclosure.

Figure 3:
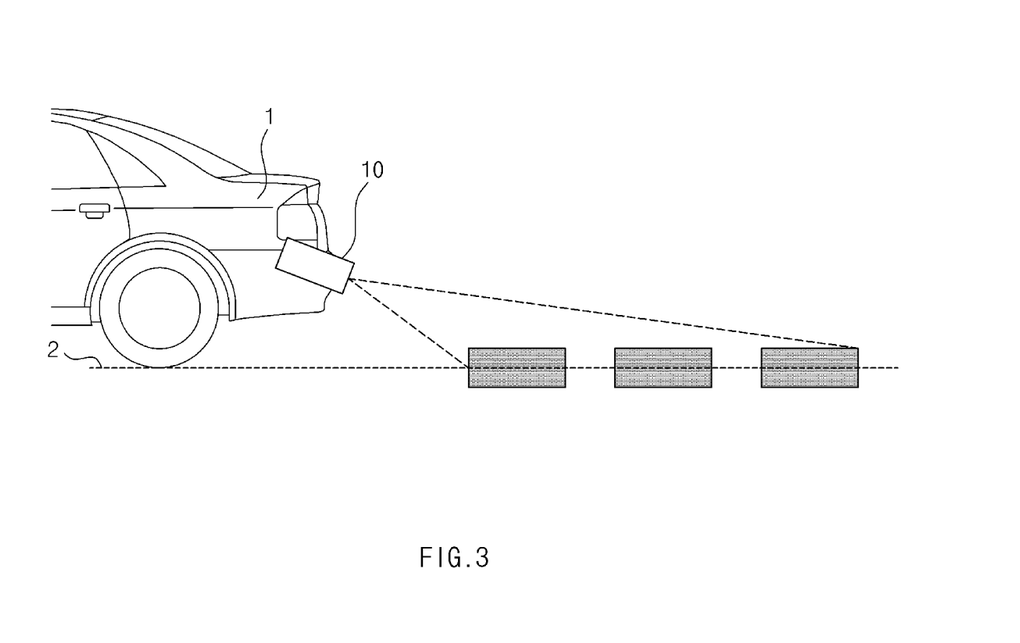
FIG. 3 is a view illustrating that a lamp for a vehicle is mounted in the vehicle, according to a first embodiment of the present disclosure.
Figure 4:
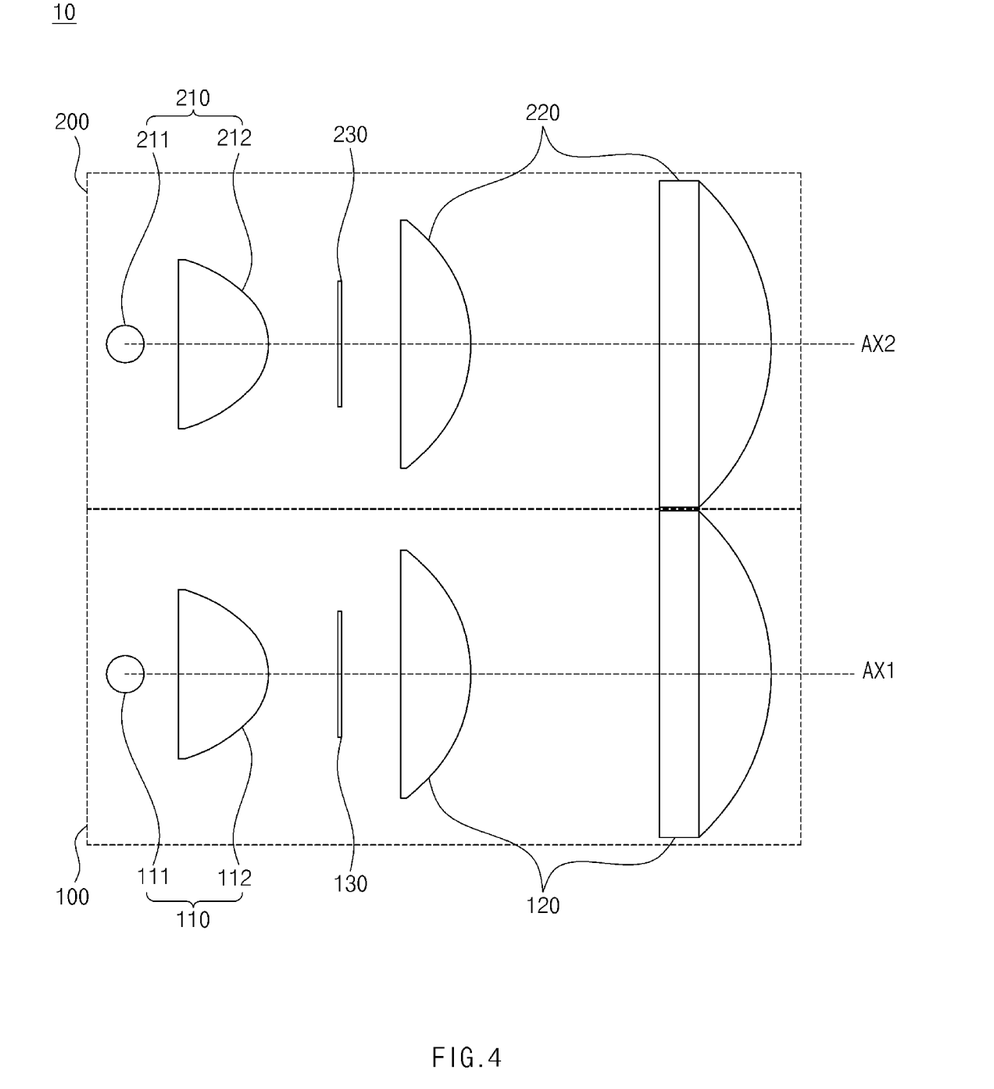
FIG. 4 is a view schematically illustrating the configuration of a lamp for a vehicle, according to a first embodiment of the present disclosure.
Figure 5:
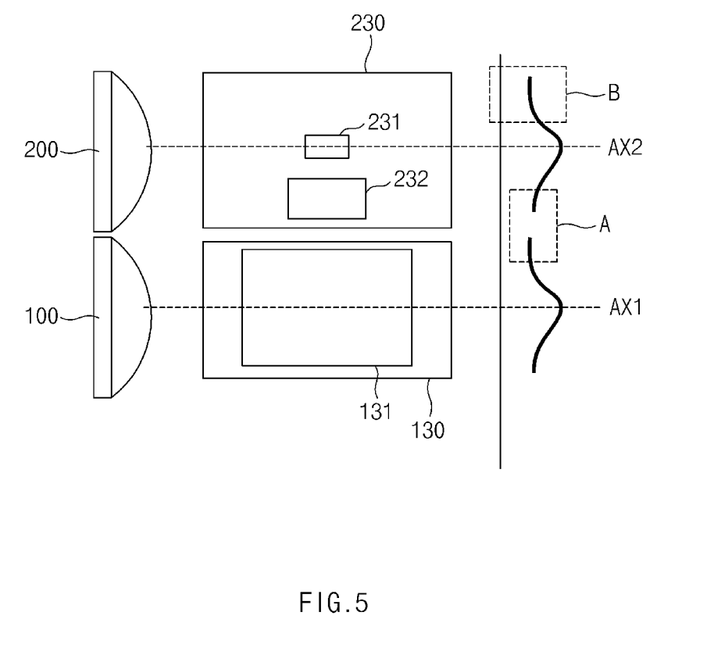
FIG. 5 is a view illustrating the distribution of a luminous intensity depending on a lamp for a vehicle, according to a first embodiment of the present disclosure.
Figure 6:
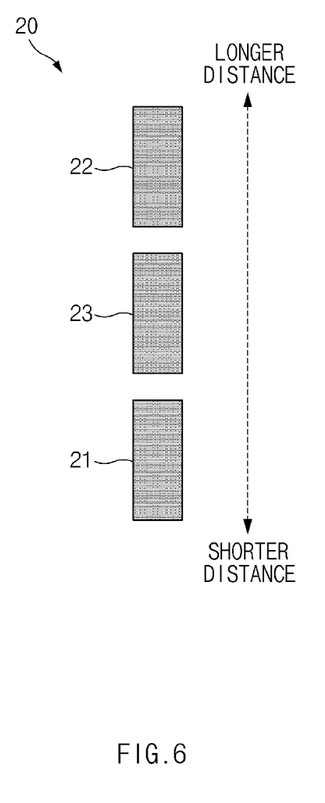
FIG. 6 is a view illustrating a beam pattern of light irradiated on a road surface by a lamp for a vehicle, according to a first embodiment of the present disclosure.
Figure 7:
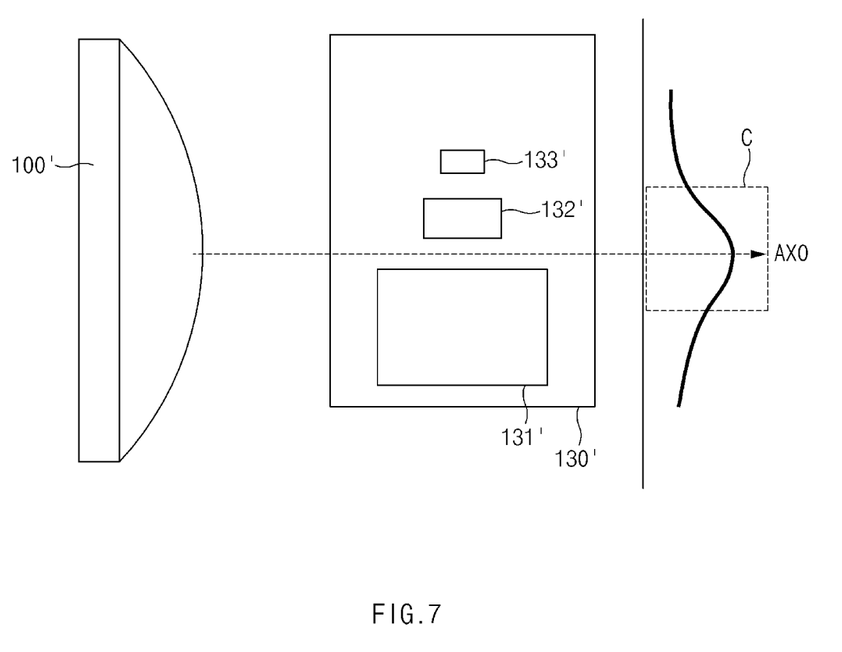
FIG. 7 is a view illustrating a comparative example that an optical unit includes one optical module, in which an optical axis is positioned at the central portion of a beam pattern.

FIG. 3 is a view illustrating that a lamp for a vehicle is mounted in the vehicle, according to a first embodiment of the present disclosure, FIG. 4 is a view schematically illustrating the configuration of a lamp for a vehicle, according to a first embodiment of the present disclosure, and FIG. 5 is a view illustrating the distribution of a luminous intensity depending on a lamp for a vehicle, according to a first embodiment of the present disclosure. FIG. 6 is a view illustrating a beam pattern of light irradiated on a road surface by a lamp for a vehicle, according to a first embodiment of the present disclosure, and FIG. 7 is a view illustrating a comparative example that an optical unit includes one optical module, in which an optical axis is positioned at the central portion of a beam pattern.

Figure 8:
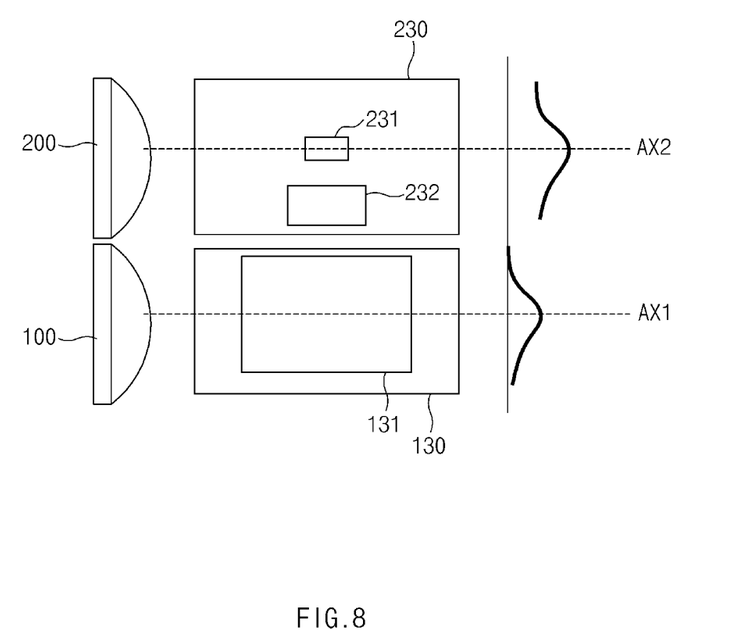
FIG. 8 is a view illustrating a lamp for a vehicle, according to a second embodiment of the present disclosure.
Figure 9:
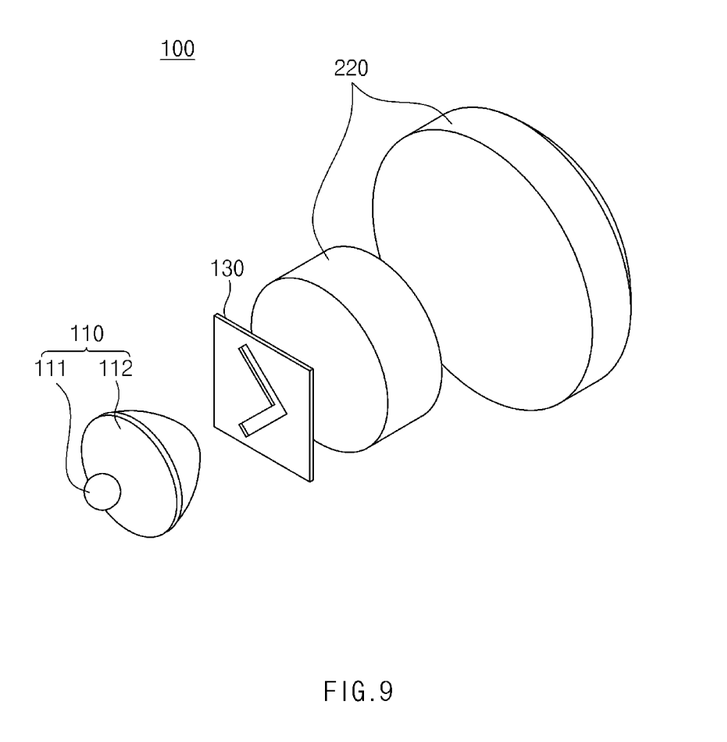
FIG. 9 is a view illustrating a modification of a first shield unit, according to a first embodiment of the present disclosure.
Figure 10:
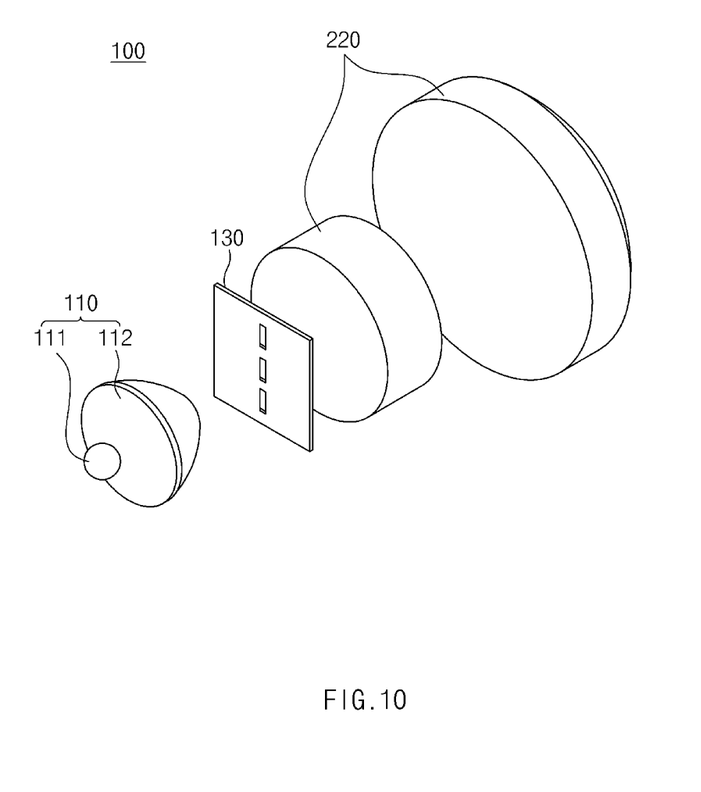
FIG. 10 is a view illustrating a modification of a first shield unit, according to a first embodiment of the present disclosure.
Figure 11:
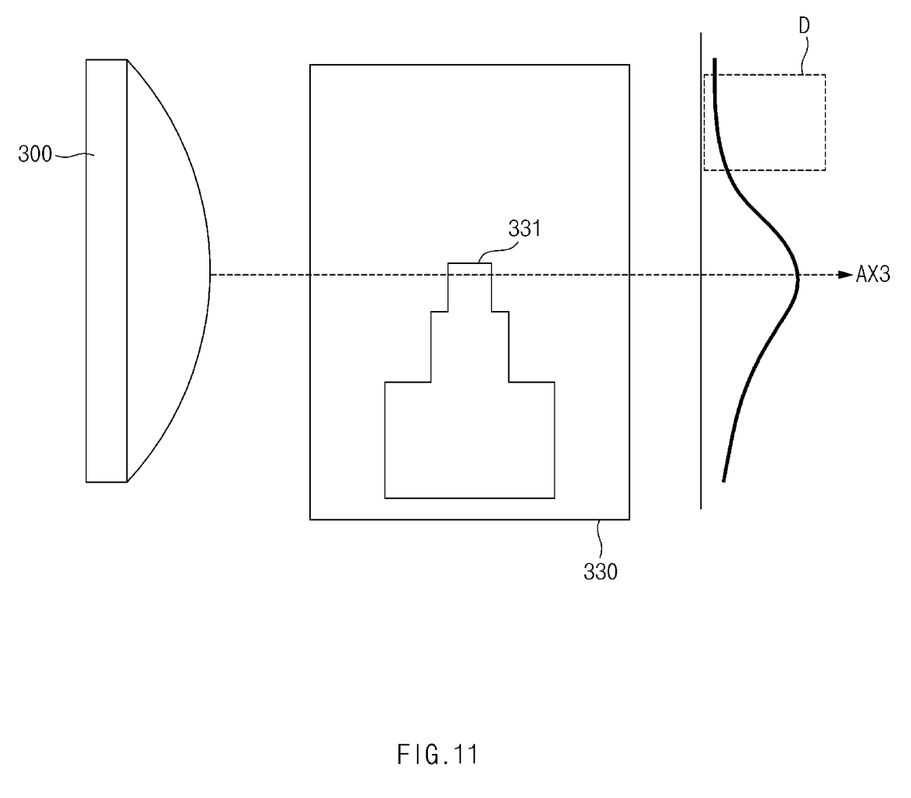
FIG. 11 is a view illustrating a lamp for a vehicle, according to a third embodiment of the present disclosure.
Figure 12:
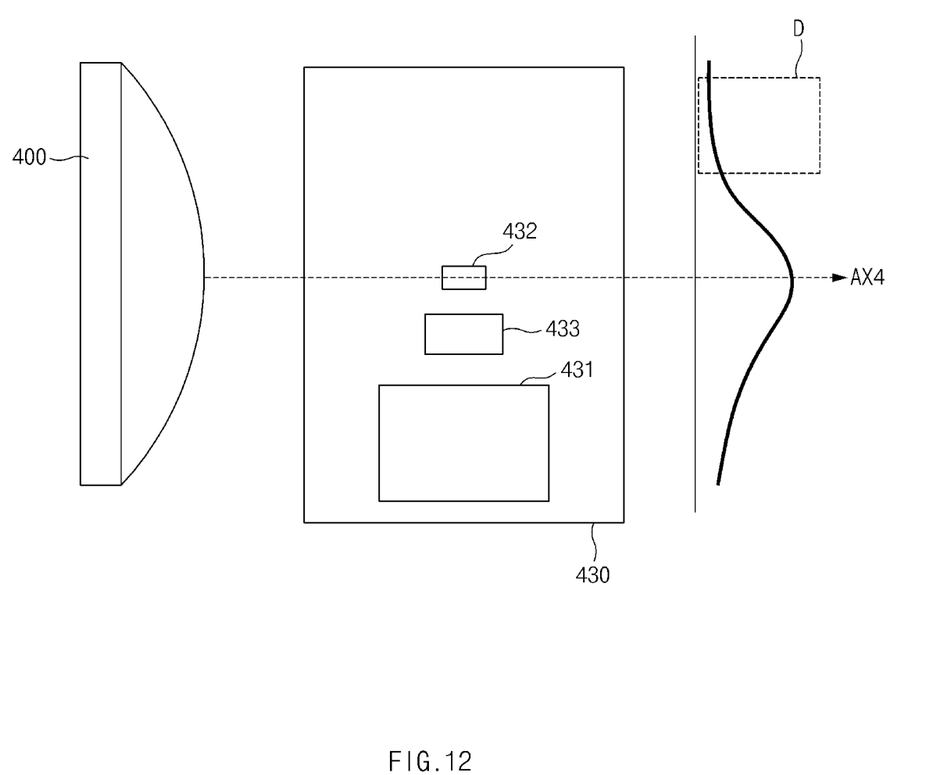
FIG. 12 is a view illustrating a lamp for a vehicle, according to a fourth embodiment of the present disclosure.

FIG. 8 is a view illustrating a lamp for a vehicle, according to a second embodiment of the present disclosure, FIG. 9 is a view illustrating a modification of a first shield unit, according to a first embodiment of the present disclosure, and FIG. 10 is a view illustrating a modification of a first shield unit, according to a first embodiment of the present disclosure. FIG. 11 is a view illustrating a lamp for a vehicle, according to a third embodiment of the present disclosure, and FIG. 12 is a view illustrating a lamp for a vehicle, according to a fourth embodiment of the present disclosure.

A lamp (hereinafter, a vehicle lamp) 10 for a vehicle according to the present disclosure may be, for example, a guide lamp to realize a pattern image having a specific shape on the road surface 2 by projecting light to the road surface 2 which is in the vicinity of a vehicle 1. For example, according to the present disclosure, the vehicle lamp 10 may be a reverse guide lamp, a welcome guide lamp, and a turn signal guide lamp which is lit together with a reverse lamp. The following description will be made while focusing on that the vehicle lamp 10 according to the present disclosure is a reverse guide lamp. However, the vehicle lamp 10 according to the present disclosure is not limited to the guide lamp, but may include various lamps provided in the vehicle 1. In addition, according to the present disclosure, even when the vehicle lamp 10 is a guide lamp, the vehicle lamp 10 is not limited to the reverse guide lamp. For example, the vehicle lamp 10 may include various lamps without limitation, as long as the vehicle lamp 10 irradiates light in a specific pattern, on the road surface. For example, the vehicle lamp 10 may employ various lamps such as a welcome guide lamp or a turn signal lamp.

Referring to FIGS. 3 to 10, according to a first embodiment of the present disclosure, the vehicle lamp 10 includes an optical unit including a plurality of optical modules to form a specific beam pattern 20 on the road surface 2. In this case, the beam pattern 20 includes a first pattern area 21, and a second pattern area 22 farther away from the optical unit, than the first pattern area 21.

In addition, the optical unit includes a first optical module 100 to form the first pattern area 21, and a second optical module 200 to form the second pattern area 22. As described later, the first pattern area 21 is placed on the optical axis of the first optical module 100, and the second pattern area 22 is placed on the optical axis of the second optical module 200.

In more detail, the optical unit according to the first embodiment of the present disclosure may include a plurality of optical modules, and may form a specific beam pattern 20 on the road surface 2 through the plurality of optical modules. For example, the beam pattern 20 may include the first pattern area 21 and the second pattern area 22. In this case, the second pattern area 22 may be a pattern area spaced apart from the first pattern area 21 and placed farther away from the optical unit than the first pattern area 21.

The beam pattern 20 according to the present disclosure may include a plurality of pattern areas, and the second pattern area 22, which is a portion of the pattern areas, may be a pattern area, which is farthest away from an optical unit, of the plurality of pattern areas. The beam pattern 20 may be changed to various-shape patterns, depending on the design specification of the vehicle and information to be transmitted by the lamp. The plurality of pattern areas may be separated from each other or overlapped with each other to form the beam pattern 20. For example, the beam pattern 20 may include a third pattern area 23 interposed between the first pattern area 21 and the second pattern area 22 (see FIG. 6).

The optical unit may include the plurality of optical modules to form the beam pattern 20. For example, the optical unit may include the first optical module 100 and the second optical module 200. According to an embodiment illustrated, the optical unit may include two optical modules. However, the number of optical modules is not limited thereto. For example, as a plurality of first optical modules 100 are provided, the optical unit may include at least three optical modules.

In this case, the plurality of optical modules may be variously arranged, as long as an optical axis of each optical module is placed in a relevant pattern area. For example, the first optical module 100 and the second optical module 200 may be arranged in various directions, such as a direction perpendicular to, horizontal to, or inclined to the road surface 2, as long as the first optical module 100 and the second optical module 200 form the first pattern area 21 and the second pattern area 22, respectively.

The first optical module 100 may be provided to form the first pattern area 21. In this case, the first pattern area 21 may be disposed on and optical axis 'AX1' of the first optical module 100, and more specifically, the optical axis 'AX1' of the first optical module 100 may be provided to pass through the center of the first pattern area 21. In this case, the first pattern area 21 may be formed through the light irradiated by the first optical module 100 of the plurality of optical modules constituting the optical unit.

The second optical module 200 may be provided to form the second pattern area 22. The second pattern area 22 may be a pattern area, which is positioned at the longest distance, of the plurality of pattern areas of the beam pattern 20, and the second optical module 200 may be provided to irradiate light for forming the second pattern area 22.

In this case, the second pattern area 22 may be placed on and optical axis 'AX2' of the second optical module 200, and more specifically, the optical axis 'AX2' of the second optical module 200 may be provided to pass through the center of the second pattern area 22. In this case, the second pattern area 22 may be formed through the light irradiated by the second optical module 200 of the plurality of optical modules constituting the optical unit.

The first optical module 100 may include a first light source unit 110, a first lens unit 120, and a first shield unit 130.

The first light source unit 110 may be provided to irradiate light in a direction toward the road surface 2. The first light source unit 110 may include a first light source 111 and a first collimator 112. For example, the first light source 111 may be a light emitting diode (hereinafter, an LED), but is not limited thereto. The first collimator 112 may convert light emitted from the first light source 111 into light parallel to the optical axis and may allow the light to be incident onto the first lens unit 120.

The first lens unit 120 may project light, which is emitted from the first light source unit 110, onto the road surface 2. The first lens unit 120 may be disposed in front of the first light source unit 110 and may be provided to transmit the light irradiated from the first light source unit 110. Although the first lens unit 120 includes a plurality of lens according to the illustrated embodiment, the first lens unit 120 may include a single lens structure.

The first shield unit 130 may be interposed between the first light source unit 110 and the first lens unit 120, and may shield a portion of light emitted from the first light source unit 110 to form the first pattern area 21.

In more detail, the first shield unit 130 may include a first through area 131 having a shape corresponding to the shape of the first pattern area 21. The image of the first pattern area 21 projected onto the road surface 2 may vary depending on the shape of the first through area 131 of the first shield unit 130. The first shield unit 130 may be formed, for example, in the shape of a plate and may form the first pattern area 21 by masking light in an area other than the first through area 131.

The second optical module 200 may include the second light source unit 210, a second lens unit 220, and a second shield unit 230.

The second light source unit 210 may be provided to irradiate light in a direction toward the road surface 2. The second light source unit 210 may include a second light source 211 and a second collimator 212. For example, the second light source 211 may be a light emitting diode (hereinafter, an LED), but is not limited thereto. The second collimator 212 may convert light emitted from the second light source 211 into light parallel to the optical axis and may allow the light to be incident into the second lens unit 220.

The second lens unit 220 may project light, which is emitted from the second light source unit 210, onto the road surface 2. The second lens unit 220 may be disposed in front of the second light source unit 210 and may be provided to transmit the light irradiated from the second light source unit 210. Although the second lens unit 220 includes a plurality of lenses according to the illustrated embodiment, the second lens unit 120 may have a single lens structure.

The second shield unit 230 may be interposed between the second light source unit 210 and the second lens unit 220, and may shield a portion of light emitted from the second light source unit 210 to form the second pattern area 22.

In more detail, the second shield unit 230 may include a second through area 231 having a shape corresponding to the shape of the second pattern area 22. The image of the second pattern area 22 projected onto the road surface 2 may vary depending on the shape of the second through area 231 of the second shield unit 230. The second shield unit 230 may be formed, for example, in the shape of a plate and may form the second pattern area 22 by masking light in an area other than the second through area 231. When the light is irradiated onto the road surface 2, the second shield unit 230 may allow the display of an image having a specific pattern or specific information, together with the first shield unit 130.

According to an embodiment illustrated, the beam pattern 20 may include the third pattern area 23 interposed between the first pattern area 21 and the second pattern area 22. In more detail, the second shield unit 230 may include a third through area 232 having a shape corresponding to the shape of the third pattern area 23. In other words, the second pattern area 22 and the third pattern area 23 may be formed by the second optical module 200, and the second pattern area 22 of the second pattern area 22 and the third pattern area 23 may be a pattern area present at the longest distance. The beam pattern 20 may be formed, as the light irradiated from the first optical module 100 and the light irradiated from the second optical module 200 are combined.

However, the shapes of the first shield unit 130 and the second shield unit 230 are not limited thereto. For example, the third through area 232 may be formed in the first shield unit 130, a plurality of first through areas 131 and a plurality of third through areas 232 may be provided, or the first through area 232 to the third through area 232 may be formed to be overlapped with each other, and may be changed to be in various shapes depending to information to be displayed (see FIG. 9 and FIG. 10).

For reference, FIG. 5 is a view illustrating the distribution of the luminous intensity of light irradiated by the first optical module 100 and the second optical module 200, respectively. The first shield unit 130 and the second shield unit 230, which are provided in the first optical module 100 and the second optical module 200, respectively, are illustrated in the central portion of FIG. 5. The distribution of the luminous intensity of light irradiated by the first optical module 100 and the second optical module 200 is illustrated at the right side of FIG. 5. In this case, reference numeral 'AX1' represents the optical axis of the first optical module 100, and reference numeral 'AX2' represents the optical axis of the second optical module 200. In addition, FIG. 6 illustrates an image of the beam pattern 20 of the light irradiated onto the road surface 2 by the first optical module 100 and the second optical module 200.

As described above, according to the present disclosure, the optical unit includes a plurality of optical modules. As the optical axis of the second optical module 200 of the optical modules is positioned in the second pattern area 22 at the longer distance, the light uniformity of the beam pattern 20 of light irradiated on the road surface may be improved.

In detail, referring to FIGS. 6 and 7, when the optical unit includes one optical module 100', the maximum luminous intensity point is positioned on an optical axis 'AX0' of the optical module (see an area 'C' of FIG. 7). Accordingly, when light is irradiated on the road surface using the optical unit including one optical module, the entire light uniformity of the beam pattern 20 is uneven. In other words, an imaging optical system has a characteristic in which the amount of light is more reduced farther away from the center of the optical axis. Since the amount of light is reduced farther away from the optical unit, it is difficult to ensure an amount of light in the second pattern area 22 which is a long-distance pattern area. In FIG. 7, an image positioned at the center may be a shield unit 130' according to a comparative example, and the shield unit 130' may include a plurality of through areas 131', 132', and 133'. When viewed in a vertical direction shown in the drawing, the through area 131' positioned at the lower most part may form the first pattern area 21, and the through area 133' positioned at the upper most part may form the second pattern area 22.

According to the present disclosure, to solve the above problem, an optical unit includes a plurality of optical modules. Among them, as an optical axis of the second optical module 200 is placed in the second pattern area 22 which is positioned at a longer distance, thereby improving the uniformity in the luminous intensity of light.

As illustrated in FIG. 5, according to an embodiment of the present disclosure, the optical unit includes a plurality of optical modules, and the optical axis of the second optical module 200 of the plurality of optical modules is positioned at the second pattern area 22 which is positioned at the longer distance, thereby improving the uniformity of the illuminance and minimizing the loss in an amount of light, such that the light efficiency is improved (see an area 'B' of FIG. 5). In addition, in the area (see an area 'A' of FIG. 5) in which two optical modules are overlapped with each other, an amounts of light from the first optical module 100 and the second optical module 200 are added up. Accordingly, the illuminance of the beam pattern may have a more uniform characteristic.

Meanwhile, as illustrated in FIG. 8, according to a second embodiment of the present disclosure, the first optical module 100 and the second optical module 200 may be provided such that the intensity of light emitted from the first optical module 100 differs from the intensity of light emitted from the second optical module 200. In detail, the intensity of the light emitted from the first optical module 100 may be formed to be less than the intensity of the light emitted from the second optical module 200.

For example, a current applied to a light source provided in the second light source unit 210 may be formed to be greater than a current applied to a light source provided in the first light source unit 110. Accordingly, the uniformity between pattern areas included in the beam pattern 20 may be more improved.

In detail, as illustrated in FIG. 5, even when two optical modules are used, and set to differ from each other in the maximum luminous intensity point, the difference in illuminance between the two optical modules may be made depending on the irradiation distances which are formed by irradiating light from the optical modules. In other words, when the first optical module 100 and the second optical module 200 irradiate light having equal intensity, the illuminance of a pattern area positioned at a shorter distance has a higher value, which reduces the uniformity in illuminance of the beam pattern.

According to the present disclosure, the intensity of the light emitted from the first optical module 100 may be formed to be less than the intensity of the light emitted from the second optical module 200 to improve the uniformity in illuminance. For example, the current applied to the first light source unit 110 is made to be less in intensity than the current applied to the second light source unit 210. Accordingly, the intensity of light emitted from the first light source module 100 may be reduced. Accordingly, the uniformity between the first pattern area 21 and the second pattern area 22 may be improved. However, a method for adjusting the intensity of light emitted from the first optical module 100 and the second optical module 200 is not limited to the above manner, and may be changed in various manner depending on the type of a light source. Meanwhile, although the first optical module 100 and the second optical module 200 are fixed in intensity of light, the intensity of light emitting from the first optical module 100 and the second optical module 200 may be controlled depending on the states of a road surface that the light emitted from the first optical module 100 and the second optical module 200 reaches. For example, when the difference between the distance, which is made as the light from the first optical module 100 reaches on the road surface, and the distance, which is made as the light from the second optical module 100 reaches, is increased, the difference between the intensity of the current applied to the first light source unit 110 and the intensity of the current applied to the second light source unit 210 may be increased, such that the illuminance of the beam pattern is uniformly formed.

Meanwhile, referring to FIGS. 9 and 10, according to an embodiment, the first shield unit 130 and the second shield unit 230 may be provided to be replaceable with each other, such that the beam pattern 20 is realized to have various shapes.

For example, the first optical module 100 may include a first base frame (not illustrated) on which the first light source unit 110, the first lens unit 120, and the first shield unit 130 are mounted, and the first shield unit 130 may be detachably coupled to the first base frame. For example, a slot into which an edge of the first shield unit 130 is inserted may be formed in the first base frame, and the first shield unit 130 may be provided to be replaceable, as the first shield unit 130 is fitted into or removed from the slot. Alternatively, for example, the first shield unit 130 may be detachably coupled to the first base frame in a bolt fastening manner, such that the first shield unit 130 is replaceable.

The second shield unit 230 may be provided to be replaceable in a manner the same as that of the first shield unit 130. In more detail, the second optical module 200 may include a second base frame (not illustrated) on which the second light source unit 210, the second lens unit 220, and the second shield unit 230 are mounted, and the second shield unit 230 may be detachably coupled to the second base frame. The second shield unit 230 may be provided to be replaceable, as the second shield unit 230 is fitted into the second base frame or removed from the slot. Alternatively, for example, the second shield unit 230 may be detachably coupled to the second base frame in a bolt fastening manner, such that the second shield unit 230 is replaceable. Although the description made with reference to FIGS. 9 and 10 is about the first optical module 100 by way of example, even the second shield unit 230 of the second optical module 200 may be replaceable to another second shield unit 230 having various shapes and various through areas.

As described above, according to an embodiment of the present disclosure, as the first shield unit 130 and the second shield unit 230 are provided to be replaceable with each other, a road pattern having various shapes may be realized by using one optical module. Therefore, according to the present disclosure, the optical unit may be used not only in a simple form for a backup guide, but also in a form of expressing various intents such as a turn signal, a welcome guide light, and a warning symbol.

Meanwhile, FIGS. 11 and 12 illustrate the third embodiment and the fourth embodiment of the present disclosure. In the present disclosure, the third embodiment and the fourth embodiment have the difference from the first embodiment in terms of one masking module and a masking unit. The third embodiment and the fourth embodiment may have the configuration of including components according to the first embodiment other than the components making the above difference.

Referring to FIG. 11, according to the third embodiment of the present disclosure, an optical unit including a third optical module 300 to form a specific beam pattern on a road surface may be provided.

In this case, the beam pattern may include a fourth pattern area. In this case, a position, which is positioned at the longest distance from the optical unit, of the fourth pattern area is defined as a long-distance point, a position, which is positioned at the shortest distance from the optical unit, is defined as a short-distance point, and an intermediate position between the long-distance point and the short-distance point is defined as an intermediate point. In this case, the optical axis of the third optical module 300 may be provided to pass through an area between the intermediate point and the long-distance point.

In more detail, the third optical module 300 may include a fourth pattern area. The fourth pattern area may be a continuous pattern. In FIG. 11, the middle image may represent a third shield unit 330 included in the third optical module 300, and the third shield unit 330 may include a fourth through area 331 to form the fourth pattern area.

According to the third embodiment of the present disclosure, one third optical module 300 may be provided, and the optical axis 'AX3' of the third optical module 300 may pass through the fourth through area 331 and pass through an area between the intermediate point and the long-distance point of the fourth pattern area. For example, the optical axis 'AX3' of the third optical module 300 may pass through a position closer to the long-distance point than the intermediate point. Accordingly, according to the third embodiment, the optical axis 'AX3' passes through the long-distance point of the fourth pattern area, such that the variation in illuminance depending on the distance between the optical unit and the fourth pattern area may be minimized.

For reference, according to the third embodiment, since the optical axis 'AX3' of the third optical module 300 is positioned at a long distance of the fourth pattern area, the light loss area may be increased (see an area 'D' of FIG. 11). Accordingly, the light efficiency may be degraded. Therefore, according to the first embodiment and the second embodiment, it is more preferred that a plurality of optical modules are provided.

Referring to FIG. 12, according to the fourth embodiment of the present disclosure, an optical unit including a fourth optical module 400 to form a specific beam pattern on a road surface may be provided.

The beam pattern may include a fifth pattern area and a sixth pattern area having at least a portion positioned at the longer distance from the optical unit than the fifth pattern area. In this case, the sixth pattern area may be disposed on the optical axis of the fourth optical module 400.

In more detail, the fourth optical module 400 may include the fourth pattern area and the sixth pattern area. Alternatively, the fourth optical module 400 may further include a seventh pattern area interposed between the fifth pattern area and the sixth pattern area. In other words, the sixth pattern area of the plurality of pattern areas formed by the fourth optical module 400 may be disposed at the longest distance from the optical unit. The fifth pattern area, the sixth pattern area, and the seventh pattern area may be formed to be separated from each other or to be overlapped with each other.

In FIG. 12, the middle image may represent a fourth shield unit 430 included in the fourth optical module 400, and the fourth shield unit 430 may include a fifth through area 431 to form the fifth pattern area, and a sixth through area 432 to form the sixth pattern area. In addition, the fourth shield unit 430 may include a seventh through area 433 to form a seventh pattern area.

According to the fourth embodiment of the present disclosure, one fourth optical module 400 may be provided, and the optical axis 'AX4' of the fourth optical module 400 may be positioned at the sixth pattern area through the sixth through area 432. Accordingly, according to the fourth embodiment, a difference in illuminance of the beam pattern between the sixth pattern area positioned a longer distance and the fifth pattern area positioned at a shorter distance may be minimized.

For reference, according to the fourth embodiment, since the optical axis 'AX4' of the fourth optical module 400 is positioned in a pattern area positioned at the longest distance, the light loss area may be increased (see an area 'D' of FIG. 12). Accordingly, the light efficiency may be degraded. Therefore, according to the first embodiment and the second embodiment, it is more preferred that a plurality of optical modules are provided.

According to an embodiment of the present disclosure, in the lamp for the vehicle, as the optical unit includes the plurality of optical modules, and an optical axis of any one of the plurality of optical modules is positioned in the second pattern area positioned at the longer distance, thereby improving the uniformity of illuminance of the beam pattern and minimizing the loss of the amount of light, such that the light efficiency is improved.

In addition, according to an embodiment of the present disclosure, the light uniformity of the beam pattern of light irradiated to the road surface may be improved by using the vehicle lamp.

According to an embodiment of the present disclosure, the first optical module and the second optical module may more improve uniformity between pattern areas included in a beam pattern by adjusting the intensity of light emitted from the first optical module and the intensity of light emitted from the second optical module to be different from each other.

According to an embodiment of the present disclosure, in the lamp for the vehicle, the optical unit includes the plurality of optical modules, and an optical axis of any one of the plurality of optical modules is positioned in the second pattern area positioned at the longer distance, thereby improving the uniformity of illuminance of the beam pattern and minimizing the loss of an amount of light, such that the light efficiency is improved.

In addition, according to an embodiment of the present disclosure, the uniformity of the beam pattern of light irradiated to the road surface may be improved by using the lamp for the vehicle.

According to an embodiment of the present disclosure, the first optical module and the second optical module may more improve uniformity between pattern areas included in the beam pattern by adjusting the intensity of light emitted from the first optical module and the intensity of light emitted from the second optical module to be different from each other.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A lamp for a vehicle, the lamp comprising:
    an optical unit including a plurality of optical modules to form a specific beam pattern on a road surface, wherein:
    the specific beam pattern includes a first pattern area, a second pattern area, and a third pattern area;
    the optical unit includes a first optical module to form the first pattern area at a first distance, and a second optical module, separate from the first optical module, to form the second pattern area at a second distance farther from the second optical module than the first pattern area is from the first optical module and the third pattern area at a third distance farther from the second optical module than the second pattern area, and wherein a current in the first optical module or the second optical module is applied such that first pattern area, the second pattern area, and the third pattern area have uniform illuminance on the road surface, and wherein a second current applied to a second light source provided in the second optical module is greater than a first current applied to a first light source provided in the first optical module thereby creating the uniform illuminance on the road surface; and
    the second pattern area is placed on an optical axis of a second module lens corresponding to the second optical module;
    wherein the first, second, and third pattern areas are formed simultaneously,
    wherein the first optical module comprises:
        a first light source unit;
        a first lens unit to project light irradiated by the first light source unit on the road surface; and
        a first shield unit interposed between the first light source unit and the first lens unit to shield a portion of the light irradiated by the first light source unit to form the first pattern area;
        wherein an optical axis corresponding to the first light source is coaxial with an optical axis corresponding to the first lens unit, the first shield unit, and the first pattern area; and
    wherein the second optical module comprises:
        a second light source unit;
        a second lens unit to project light irradiated by the second light source unit on the road surface; and
        a second shield unit interposed between the second light source unit and the second lens unit to shield a portion of the light irradiated by the second light source unit to form the second pattern area.

2. The lamp of claim 1, wherein the optical axis of the second optical module passes through a central portion of the second pattern area.

3. The lamp of claim 1, wherein the first optical module and the second optical module are configured such that intensity of light emitted from the first optical module differs from intensity of light emitted from the second optical module.

4. The lamp of claim 2, wherein the first pattern area is placed on an optical axis of the first optical module.

5. The lamp of claim 4, wherein the optical axis of the first optical module passes through a central portion of the first pattern area.

6. The lamp of claim 1, wherein the first shield unit is configured such that it creates the specific beam pattern including one or more shapes by shielding a portion of the light irradiated by the first light source unit.

7. The lamp of claim 1, wherein the second shield unit is configured such that it creates the specific beam pattern including one or more shapes by shielding a portion of the light irradiated by the second light source unit.

8. The lamp of claim 1, wherein the specific beam pattern includes:
    the third pattern area interposed between the first pattern area and the second pattern area,
    wherein the first shield unit includes a first through area having a shape corresponding to a shape of the first pattern area,
    wherein the second shield unit includes a second through area having a shape corresponding to a shape of the second pattern area, and wherein a third through area having a shape corresponding to a shape of the third pattern area, is created by one or more of the first shield unit, second shield unit, or a third shield unit corresponding to a third optical module.

9. A lamp for a vehicle, the lamp comprising:
an optical unit including a first optical module to form a specific beam pattern on a road surface, a second optical module separate from the first optical module, wherein the specific beam pattern includes:
a first pattern area formed by the first optical module and a second pattern area and a third pattern area formed by the second optical module; and
wherein an optical axis of the first optical module is provided to pass through an area between an intermediate point and a long-distance point, wherein a position that is at a longest distance from the optical unit of the pattern area is defined as the long-distance point, a position that is at a shortest distance from the optical unit is defined as a short-distance point, and an intermediate position between the long-distance point and the short-distance point is defined as an intermediate point, and wherein a second current applied to a second light source provided in the second optical module is greater than a first current applied to a first light source provided in the first optical module to thereby creating an uniform illuminance on the road surface; wherein the third pattern area is formed at a distance farther from the second optical module than the second pattern area;
wherein the first, second, and third pattern areas are formed simultaneously;
wherein the first optical module comprises:
a first light source unit;
a first lens unit to project light irradiated by the first light source unit on the road surface; and
a first shield unit interposed between the first light source unit and the first lens unit to shield a portion of the light irradiated by the first light source unit to form the first pattern area;
wherein an optical axis corresponding to the first light source is coaxial with an optical axis corresponding to the first lens unit, the first shield unit, and the first pattern area; and
wherein the second optical module comprises:
a second light source unit;
a second lens unit to project light irradiated by the second light source unit on the road surface; and
a second shield unit interposed between the second light source unit and the second lens unit to shield a portion of the light irradiated by the second light source unit to form the second pattern area.

10. A lamp for a vehicle, the lamp comprising:
an optical unit including a first optical module to form a first pattern area of a specific beam pattern on a road surface, a second optical module separate from the first optical module that forms a second pattern area and a third pattern area of the specific beam pattern,
wherein the second pattern area is positioned at a longer distance from the optical unit than the first pattern area, and wherein a second current applied to a second light source provided in a second light source unit in the second optical module is greater than a first current applied to a first light source provided in a first light source unit in the first optical module thereby creating an uniform illuminance on a road surface; and
wherein the second pattern area is placed on an optical axis of the second optical module; wherein the third pattern area is formed at a distance farther from the second optical module than the second pattern area; wherein the first, second, and third pattern areas are formed simultaneously;
wherein the first optical module comprises:
a first light source unit;
a first lens unit to project light irradiated by the first light source unit on the road surface; and
a first shield unit interposed between the first light source unit and the first lens unit to shield a portion of the light irradiated by the first light source unit to form the first pattern area;
wherein an optical axis corresponding to the first light source is coaxial with an optical axis corresponding to the first lens unit, the first shield unit, and the first pattern area; and
wherein the second optical module comprises:
a second light source unit;
a second lens unit to project light irradiated by the second light source unit on the road surface; and
a second shield unit interposed between the second light source unit and the second lens unit to shield a portion of the light irradiated by the second light source unit to form the second pattern area.

* * * * *